(12) United States Patent
Tordera et al.

(10) Patent No.: US 6,889,057 B2
(45) Date of Patent: May 3, 2005

(54) PDA CRADLE FOR WIRELESS IP COMMUNICATION

(75) Inventors: Virgil Flores Tordera, Chula Vista, CA (US); Masao Nishikawa, La Jolla, CA (US)

(73) Assignees: Sony Corporation, Tokyo (JP); Sony Corporation of America, New York, NY (US)

( * ) Notice: Subject to any disclaimer, the term of this patent is extended or adjusted under 35 U.S.C. 154(b) by 629 days.

(21) Appl. No.: 09/839,059

(22) Filed: Apr. 20, 2001

(65) Prior Publication Data

US 2002/0155860 A1 Oct. 24, 2002

(51) Int. Cl.[7] .............................................. H04M 1/00
(52) U.S. Cl. ................. 455/557; 455/556.1; 455/556.2; 455/41.2; 455/566
(58) Field of Search .............................. 455/557, 556.1, 455/556.2, 558, 41.2, 41.3, 414.1, 550.1, 13.1, 427, 562.1; 708/109; 710/1

(56) References Cited

U.S. PATENT DOCUMENTS

| | | | | |
|---|---|---|---|---|
| 5,606,594 A | * | 2/1997 | Register et al. .......... 455/556.2 |
| 5,675,524 A | * | 10/1997 | Bernard ...................... 708/109 |
| 5,822,546 A | * | 10/1998 | George ....................... 710/303 |
| 5,864,708 A | * | 1/1999 | Croft et al. .................... 710/1 |
| 5,930,704 A | * | 7/1999 | Kay ........................... 455/419 |
| 5,960,343 A | * | 9/1999 | Ray et al. ................... 455/431 |
| 6,266,539 B1 | * | 7/2001 | Pardo ....................... 455/556.2 |
| 6,405,049 B2 | * | 6/2002 | Herrod et al. ............. 455/517 |
| 6,453,176 B1 | * | 9/2002 | Lopes et al. ............. 455/562.1 |
| 6,486,830 B1 | * | 11/2002 | Kohno et al. ............... 342/383 |
| 6,529,707 B1 | * | 3/2003 | Dent ......................... 455/13.1 |
| 6,600,657 B1 | * | 7/2003 | Yerazunis et al. .......... 361/737 |
| 6,678,259 B1 | * | 1/2004 | Schwengler ................ 370/329 |
| 2001/0055978 A1 | * | 12/2001 | Herrod et al. ............. 455/517 |
| 2002/0058539 A1 | * | 5/2002 | Underbrink et al. ........ 455/575 |
| 2002/0137538 A1 | * | 9/2002 | Chen et al. ................ 455/550 |

* cited by examiner

*Primary Examiner*—Sonny Trinh
*Assistant Examiner*—Huy Phan
(74) *Attorney, Agent, or Firm*—John L. Rogitz

(57) ABSTRACT

A PDA cradle includes a wireless Internet packet (IP) transceiver and a receptacle for holding a PDA to establish wireless communication between the PDA and a base station of a wireless LAN/WAN.

7 Claims, 1 Drawing Sheet

-System

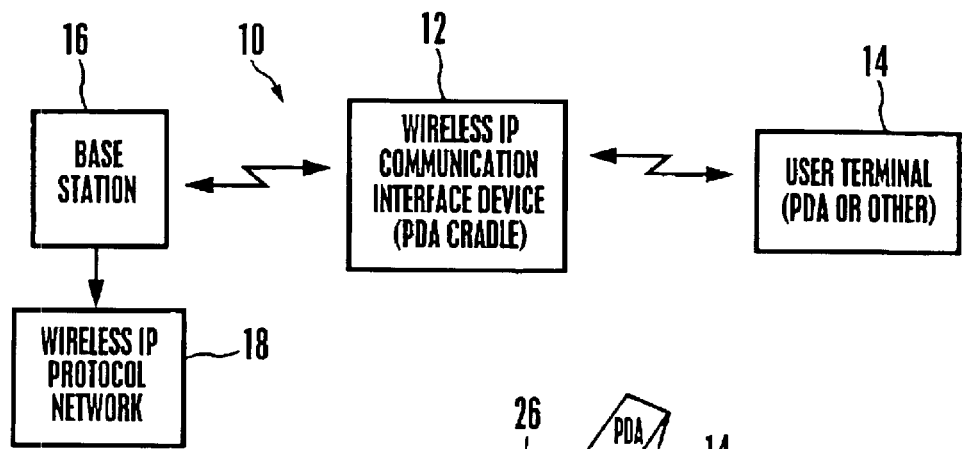
Figure 1 -System
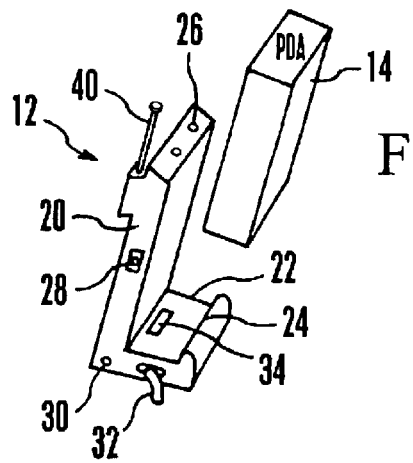
Figure 2 PDA cradle
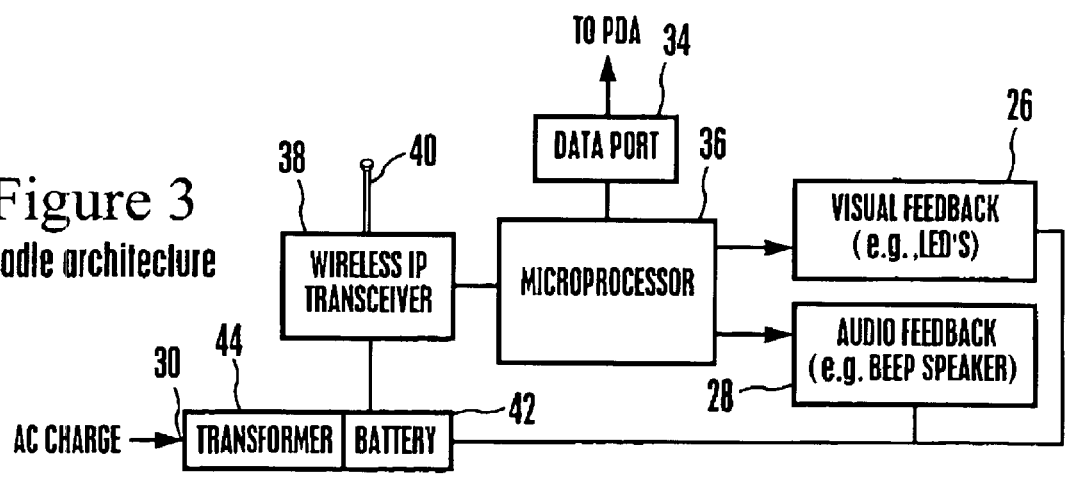
Figure 3 Cradle architecture
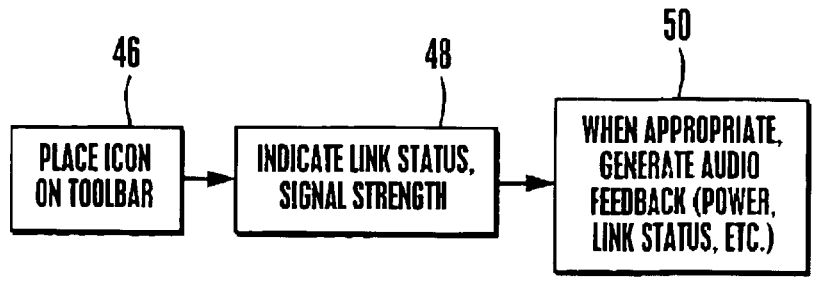
Figure 4 logic

US 6,889,057 B2

PDA CRADLE FOR WIRELESS IP COMMUNICATION

BACKGROUND OF THE INVENTION

1. Field of the Invention

The present invention relates generally to wireless Internet Packet (IP) communication devices.

2. Description of the Related Art

Networked computing is a powerful tool for business and personal use. With it, the user of a user terminal that communicates with a network such as a company's local area network (LAN) or a wide area network (WAN) can access and share data with other terminals in the network.

Most LAN/WANs are implemented by wired connections, i.e., by requiring that the computers in a network be attached to the network by means of wires. For convenience and to permit easy movement of user terminals within the Network, wireless Networks have been introduced, in which network communication is established via a wireless radiofrequency (rf) or infrared (IR) link.

As recognized by the present invention, a wireless communication interface can be established by connecting an interface component to a user terminal such as a personal digital assistant (PDA) or other computing device such as a laptop computer or personal computer. Once connected, the interface component can be used to transfer data via the wireless link between the user terminal and the network.

Moreover, the present invention understands that much communication, particularly Internet-related communication, is in so-called Internet Packet (IP) format. As understood herein, it consequently would be advantageous for a wireless computing system to support broadband IP communications.

As also recognized herein, using an interface component that is separate from, e.g., a conventional PDA but that can be coupled to the PDA to effect IP wireless communication avoids the necessity of requiring each PDA vendor reconfiguring the PDA itself. In this way, off-the-shelf PDAs can be used in a wireless IP application. Having recognized the above-noted issues, the present invention provides the solution disclosed herein.

SUMMARY OF THE INVENTION

A communication interface device includes a base with receptacle for receiving a personal digital assistant (PDA). When the PDA is in the receptacle it engages a connector, such as but not limited to a serial bus connector, on the base. A wireless Internet packet (IP) transceiver is supported by the base and communicates with the PDA.

In preferred implementations the wireless transceiver operates at a frequency of at least two thousand three hundred million Hertz and no more than two thousand three hundred ten million Hertz. An associated directional antenna can be connected to the transceiver.

If desired, light emitting diodes (LED) can be mounted on the base and can be operable to indicate whether the transceiver is communicating with a base station. Also, an audio speaker can be provided on the base for the same or similar purposes.

To power the transceiver a battery is included in the base. The present invention provides for an audio or visual indication (e.g., by means of the LEDs or speaker) of a low voltage condition of the battery. A charger port can also be formed on the base and electrically connected to the battery.

In another aspect, a wireless communication device for providing at least one communication interface to a portable computer includes holder means for closely receiving the computer. Electrical connection means are on the holder means for establishing electrical contact with the computer when the computer is held by the holder means. Further, wireless IP transceiver means are on the holder means for establishing a communication pathway between the computer and a wireless IP network when the computer is held by the holder means.

In yet another aspect, a method for establishing wireless IP communication between a portable computer and at least one base station includes providing a cradle configured for closely receiving the computer, with the cradle including at least one connector. An IP transceiver is in the cradle. As set forth more fully below, the IP transceiver is electrically connected to the connector. Accordingly, IP communication can be established between the base station and computer when the computer is engaged with the cradle.

The details of the present invention, both as to its structure and operation, can best be understood in reference to the accompanying drawings, in which like reference numerals refer to like parts.

BRIEF DESCRIPTION OF THE DRAWINGS

FIG. 1 is a schematic diagram showing the system architecture of the present invention;

FIG. 2 is a perspective view of a preferred wireless IP communication PDA cradle in an exploded relationship with a PDA;

FIG. 3 is a block diagram showing the electronic architecture of the cradle shown in FIG. 2; and FIG. 4 is a flow chart showing the operating logic of the system.

DETAILED DESCRIPTION OF THE PREFERRED EMBODIMENTS

Referring initially to FIG. 1, a system is shown, generally designated 10, that includes a communication interface device, preferably the PDA cradle 12 described herein, engageable with a user terminal, such as but not limited to a personal digital assistant (PDA) 14 for establishing wireless communication between the PDA 14 and a base station 16 of a wireless network 18. In one non-limiting embodiment used only for illustration purposes, the network 18 can have a broadband Internet packet (IP) data protocol, such as an i-Burst network made by Arraycomm. Such a network can use space division multiple access (SDMA) directional communication principles and has a data transfer rate in excess of one megabyte per second.

FIG. 2 shows one preferred embodiment of the cradle 12. As shown, the cradle 12 can include a preferably plastic base 20 that is formed with a receptacle 22. The receptacle 22 is configured for closely receiving the PDA 14 therein. In the exemplary non-limiting embodiment shown in FIG. 2, the PDA 14 is held generally upright in the receptacle 22. A raised lip 24 can extend across the front side of the receptacle 22 to retain the PDA 14 in the receptacle 22.

One or more visual indications such as but not limited to light emitting diodes (LED) 26 can be mounted on the base 20 to indicate whether the below-described transceiver within the base 20 is communicating with the base station 16, and/or to indicate a low voltage condition of the below-described battery, and/or to indicate other events such as power on and so on. Still further, an audio indication such as but not limited to a small audio speaker or beeper 28 can be mounted on the base 20 to indicate these same or different conditions. It is to be understood that the PDA 14 can alternatively provide such audible and/or visual indications.

To provide for recharging the below-described battery, a charger port 30 configured for receiving a charger plug (not shown) can be formed in the base 20 and can be electrically connected to the battery via an appropriate transformer. To conserve battery power, a power switch 32 can be provided on the base 20 and electrically connected to the battery therein so that a user can selectively connect and disconnect the battery from the remainder of the components in the base 20.

Completing the description of FIG. 2, an electrical connector 34 is formed on the base 20, preferably in the receptacle 22, such that when the PDA 14 is in the receptacle 22, the connector 34 contacts a complementarily-formed connector on the PDA 14. In this way, electrical connectivity is established between the PDA 14 and the circuitry inside the base 20. Accordingly, the connector 34 essentially establishes a data port to and from the PDA 14. In one intended embodiment the data port is a serial data port.

This circuitry can be better understood in reference to FIG. 3. As shown, a microprocessor 36 is disposed in the base 20 and is electrically connected to the LEDs 26 and speaker 28 to activate these components in accordance with principles set forth above. Also, a wireless IP transceiver 38 is located in the base and is connected to or implemented by the microprocessor 36. The transceiver 38 is also connected to a preferably directional dipole antenna 40 that is adjustably mounted on the base 20 for telescoping or flipping up and down, and that can also be removably mounted on the base 20. In any case, as intended by the present invention the wireless IP transceiver 38 can be provided by Arraycomm. Such a transceiver operates in a frequency range of between nine kiloHertz to fifty gigaHertz (9 kHz–50 gHz) and more preferably in a range between two thousand three hundred million Hertz and two thousand three hundred ten million Hertz (2300 mHz–2310 mHz). It is to be understood that the transceiver 38 and possibly microprocessor 36 can be integral to a flash memory card, a USB/PC card, or other electrical circuit arrangement permanently or removably engaged with the cradle 12.

FIG. 3 shows that if desired, a rechargeable dc battery 42 can be included with the base 20. As shown in FIG. 3, the battery 42 powers the appropriate components in the base 20. To provide for recharging the battery 42 using an ac power source, a transformer 44 can be connected thereto and to the charger port 30. It is to be understood that the cradle 12 and PDA 14 can received power directly from the transformer 44 while an ac power source is plugged in to the charger port 30, with the battery being simultaneously recharged.

The chipsets, firmware, or software of the cradle 12 are configured for operating with the PDA 14, it being understood that the PDA 14 can also be programmed, perhaps by means of a USB/PC card, to interface with the cradle 12 including presenting the below-described icon and indications in accordance with the principles disclosed herein. The flow charts herein illustrate the structure of a logic device of the present invention as embodied in computer program software. Those skilled in the art will appreciate that the flow charts illustrate the structures of logic elements, such as computer program code elements or electronic logic circuits, that function according to this invention. Manifestly, the invention is practiced in its essential embodiment by a machine component that renders the logic elements in a form that instructs a digital processing apparatus (that is, a computer) to perform a sequence of function steps corresponding to those shown. Internal logic could be as simple as a state machine.

In other words, the present logic may be established as a computer program that is executed by a processor as a series of computer-executable instructions. In addition to residing on hard disk drives, these instructions may reside, for example, in RAM of the appropriate computer, or the instructions may be stored on magnetic tape, electronic read-only memory, or other appropriate data storage device.

With the above in mind, once the cradle 12 has been engaged with the PDA 14, the logic of FIG. 4 can be invoked. Commencing at block 46, an icon representing the cradle 12 can be placed on the toolbar of the display of the PDA 14. As mentioned above, at block 48 the LEDs 26 on the cradle 12 or the display of the PDA 14 itself can indicate link status, battery 42 status, cradle 12 power on status, link signal strength, and so on. Audible feedback of these parameters can also be provided by the PDA 14 or cradle 12 at block 50.

While the particular PDA CRADLE FOR WIRELESS IP COMMUNICATION as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular means "at least one". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for".

What is claimed is:

1. A method for establishing wireless IP communication between a portable computer and at least one base station, comprising:

providing a cradle configured for closely receiving the portable computer, the cradle including at least one connector;

providing at least one IP transceiver in the cradle, the IP transceiver being electrically connected to the connector, whereby IP communication is established between the base station and portable computer when the computer is engaged with the cradle; and displaying on the portable computer, at lease one icon representing the cradle.

2. The method of claim 1, further comprising providing a visual indication on the cradle representative of a status of IP communication.

3. The method of claim 1, further comprising providing an audio indication on the cradle representative of a status of IP communication.

4. The method of claim 1, further comprising providing a rechargeable power supply in the cradle.

5. The method of claim 4, further comprising providing a charging jack on the base electrically connected to the power supply.

6. The method of claim 1, further comprising operating the transceiver at a frequency range of between two thousand three hundred million Hertz and two thousand three hundred ten million Hertz (2300 mHz–2310 mHz), inclusive.

7. The method of claim 1, further comprising operating the transceiver at a frequency range of between nine kiloHertz and fifty gigaHertz (9 kHz–50 gHz), inclusive.

* * * * *